(12) United States Patent
Katoh et al.

(10) Patent No.: US 7,393,568 B2
(45) Date of Patent: *Jul. 1, 2008

(54) LIQUID CRYSTAL COMPOSITION AND LIQUID CRYSTAL ELEMENT EMPLOYING THE COMPOSITION

(75) Inventors: Takashi Katoh, Minami-ashigara (JP); Hirotaka Kitagawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/086,404

(22) Filed: Mar. 23, 2005

(65) Prior Publication Data

US 2005/0218375 A1 Oct. 6, 2005

(30) Foreign Application Priority Data

Mar. 25, 2004 (JP) ............................. 2004-089769

(51) Int. Cl.
*C09K 19/52* (2006.01)
*C09K 19/54* (2006.01)
*C09K 19/60* (2006.01)

(52) U.S. Cl. ................. 428/1.1; 252/299.01; 252/299.1; 252/299.5

(58) Field of Classification Search .................. 428/1.1; 252/299.01, 299.1, 299.5
See application file for complete search history.

(56) References Cited

U.S. PATENT DOCUMENTS

| | | | |
|---|---|---|---|
| 5,006,276 A * | 4/1991 | Kaneko et al. ............ | 252/299.1 |
| 7,220,466 B2 * | 5/2007 | Katoh et al. .............. | 428/1.1 |
| 7,316,829 B2 * | 1/2008 | Kato et al. ............... | 428/1.1 |
| 2005/0173673 A1 * | 8/2005 | Kitagawa ................ | 252/299.62 |
| 2006/0060822 A1 * | 3/2006 | Takaku et al. ........... | 252/299.01 |

FOREIGN PATENT DOCUMENTS

| | | | |
|---|---|---|---|
| EP | 103095 | * | 3/1984 |
| JP | 02178390 | * | 7/1990 |
| JP | 2001-234465 | | 8/2001 |
| WO | WO 03/014259 | * | 2/2003 |

OTHER PUBLICATIONS

English abstract for EP 103095 by Derwent.*
English abstract for JP 02-178390 by Derwent.*

* cited by examiner

*Primary Examiner*—Shean C Wu
(74) *Attorney, Agent, or Firm*—Buchanan Ingersoll & Rooney PC

(57) ABSTRACT

A novel liquid crystal composition and a novel liquid crystal element are disclosed. They comprise at least one compound represented by a formula (1), wherein $R^1$ to $R^7$ respectively represent a hydrogen atom or a substituent, provided that at least one of $R^1$, $R^2$, $R^5$ and $R^6$ represents a substituted or non-substituted alkyl group, cycloalkyl group, aryl group or heteroaryl group; S represents a sulfur atom, $B^1$ and $B^2$ respectively represent a substituted or non-substituted arylene group, heteroarylene group or divalent cyclic aliphatic hydrocarbon group; $Q^1$ represents a divalent linking group, $C^1$ represents a substituted or non-substituted alkyl group, cycloalkyl group, alkoxy group, alkoxycarbonyl group, acyl group or acyloxy group; p, q and r respectively represent an integer from 0 to 5 and n is an integer from 1 to 3, provided that $(p+r) \times n$ is from 3 to 10

Formula (I)

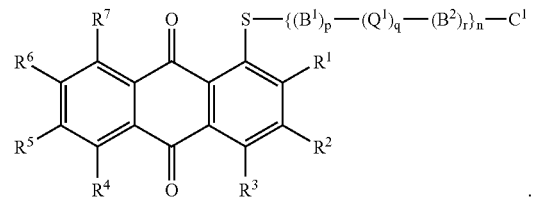

19 Claims, No Drawings

LIQUID CRYSTAL COMPOSITION AND LIQUID CRYSTAL ELEMENT EMPLOYING THE COMPOSITION

CROSS-REFERENCE TO RELATED APPLICATIONS

This application claims benefit of priority under 35 USC 119 to Japanese Patent Application No. 2004-089769 filed Mar. 25, 2004.

TECHNICAL FIELD

The present invention relates to a liquid crystal composition and a liquid crystal element employing the composition, which is especially suitable for a guest-host-type liquid crystal element.

RELATED ART

Displays for digital information, occasionally referred to as "electronic paper", have grown in importance with dissemination of digital information. The electronic papers are required to have a high level of visibility and work with little electric power. "High visibility" means a white background closely similar to papers, and, thus, a mode in which white background is based on scattering, as well as in papers, is suited to electronic papers. From the point of little electric power consumption, a reflection displaying mode is preferred to a self-luminous displaying mode. Various modes, such as a reflection displaying mode, an electrophoretic displaying mode, a magnetic guidance displaying mode, a bicolored-balls-rotation mode, an electrochromic displaying mode and a leuco thermal displaying mode, have been provided for electronic papers. However, from the point of high visibility, none of them can reach the level required, and it is required to improve visibility.

There are known various types of liquid crystal devices. Among them, liquid crystal displays employing a guest-host-mode are capable of bright display, and therefore are expected as a reflection mode display. A guest-host-mode liquid crystal device has a cell filled with a liquid crystal composition comprising nematic liquid crystal as a host and at least one dichroic dye dissolved therein as a guest. When a voltage is applied to the cell sufficient to rotate the liquid crystal molecules, the dye molecules rotate along with the liquid crystal molecules and allow changing of light absorption by the cell to thereby effect display.

Dichroic dyes employed in guest-host-mode liquid crystal devices are required to have a proper absorption property, a high order parameter, a high solubility for host liquid crystal, a high durability and so forth. For producing display devices with high contrasts, it is important to use dichroic dyes having both of a high order parameter and a high solubility. However, among known dichroic dyes, many of the dichroic dyes giving a high order parameter exhibit a low solubility, and, thus, it is required to develop dichroic dyes having both of a high order parameter and a high solubility.

The present inventors develop anthraquinone dyes, substituted with a particular group, having both of a high order parameter and a high solubility, and the dyes are disclosed in Japanese Patent Application No. 2001-234465.

SUMMARY OF THE INVENION

One object of the present invention is to provide a liquid crystal composition useful for production of a liquid crystal display with a high contrast and to provide a liquid crystal display with a high contrast.

The inventors know that the display contrast of a liquid crystal element employing a guest-host mode is varied depending on the order parameter or the solubility of dichroic dye employed in a liquid crystal cell. The inventors conducted various studies, and as a result, they found that a particular class of dichroic dye, having an anthraquinone moiety substituted with a group selected from a particular group, gives an unexpected effect, or, in other words, exhibits both of a high order parameter and a high solubility. On the basis of these findings, the present invention was achieved.

In one aspect, the present invention provides a composition comprising at least one liquid crystal and at least one compound represented by a formula (I):

Formula (I)

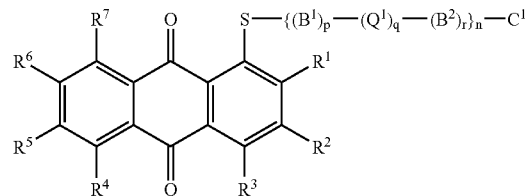

where $R^1$, $R^2$, $R^3$, $R^4$, $R^5$, $R^6$ and $R^7$ respectively represent a hydrogen atom or a substituent, provided that at least one of $R^1$, $R^2$, $R^5$ and $R^6$ represents a substituted or non-substituted alkyl group, cycloalkyl group, aryl group or heteroaryl group; S represents a sulfur atom, $B^1$ and $B^2$ respectively represent a substituted or non-substituted arylene group, heteroarylene group or divalent cyclic aliphatic hydrocarbon group; $Q^1$ represents a divalent linking group, $C^1$ represents a substituted or non-substituted alkyl group, cycloalkyl group, alkoxy group, alkoxycarbonyl group, acyl group or acyloxy group; p, q and r respectively represent an integer from 0 to 5 and n is an integer from 1 to 3, provided that $(p+r) \times n$ is from 3 to 10; when p, q or r is 2 or more, plural $B^1$, $Q^1$ or $B^2$ may be same or different each other; and when n is 2 or more, plural $\{(B^1)_p\text{-}(Q^1)_q\text{-}(B^2)_r\}$ may be same or different each other.

In another aspect, the present invention provides a liquid crystal element comprising a pair of electrodes, at least one of which is a transparent electrode, and a liquid-crystal cell disposed between the pair of electrodes, and formed of a composition comprising at least one liquid-crystal and at least one compound represented by the formula (I).

According to the present invention, it is possible to provide liquid crystal elements with high contrasts.

DETAILED DESCRIPTION OF THE INVENTION

Hereafter, the present invention will be explained in detail. In the specification, ranges indicated with "to" mean ranges including the numerical values before and after "to" as the minimum and maximum values.

The present invention relates to a composition comprising liquid crystal and at least one compound represented by a formula (1). The formula (1) will be described in detail.

Formula (1)

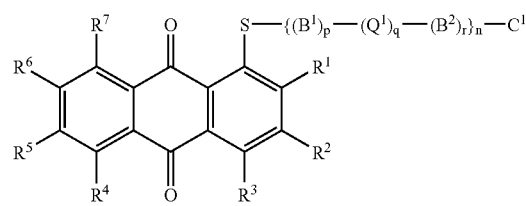

In the formula, $R^1$, $R^2$, $R^3$, $R^4$, $R^5$, $R^6$ and $R^7$ respectively represent a hydrogen atom or a substituent, provided that at least one of $R^1$, $R^2$, $R^5$ and $R^6$ represents a substituted or non-substituted alkyl group, cycloalkyl group, aryl group or heteroaryl group.

The substituent may be selected from Substituent Group V described below.

Substituent Group V

Halogen atom such as chlorine, bromine, iodine or fluorine; a mercapto group, a cyano group, a carboxyl group, a phosphoric acid group, a sulfonic acid group, a hydroxy group, a carbamoyl groups having $C_{1-10}$, preferably $C_{2-8}$, more preferably $C_{2-5}$ (e.g., methylcarbamoyl, ethylcarbamoyl, morpholinocarbamoyl); sulfamoyl groups having $C_{0-10}$, preferably $C_{2-8}$, and more preferably $C_{2-5}$ (e.g., methylsulfamoyl, ethylsulfamoyl, piperidinosulfamoyl); nitro group; alkoxy groups having $C_{1-20}$, preferably $C_{1-10}$, more preferably $C_{1-8}$ (e.g., methoxy, ethoxy, 2-methoxyethoxy, 2-phenylethoxy); aryloxy groups having $C_{6-20}$, preferably $C_{6-12}$, more preferably $C_{6-10}$ (e.g., phenoxy, p-methylphenoxy, p-chlorophenoxy, naphthoxy); acyl groups having $C_{1-20}$, preferably $C_{2-12}$, more preferably $C_{2-8}$ (e.g., acetyl, benzoyl, trichloroacetyl); acyloxy groups having $C_{1-20}$, preferably $C_{2-12}$, more preferably $C_{2-8}$ (e.g., acetyloxy, benzoyloxy); acylamino groups having $C_{1-20}$, preferably $C_{2-12}$, more preferably $C_{2-8}$ (e.g., acetylamino); sulfonyl groups having $C_{1-20}$, preferably $C_{1-10}$, more preferably $C_{1-8}$ (e.g., methanesulfonyl, ethanesulfonyl, benzenesulfonyl); sulfinyl groups having $C_{1-20}$, preferably $C_{1-10}$, more preferably $C_{1-8}$ (e.g., methanesulfinyl, ethanesulfinyl, benzenesulfinyl); sulfonylamino groups having $C_{1-20}$, preferably $C_{1-10}$, more preferably $C_{1-8}$ (e.g., methanesulfonylamino, ethanesulfonylamino, benzenesulfonylamino); amino groups having $C_{0-20}$, preferably $C_{1-12}$, more preferably $C_{1-8}$ (e.g., amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino, N,N-ethylphenylamino); ammonium groups having $C_{0-15}$, preferably $C_{3-10}$, more preferably $C_{3-6}$ (e.g., trimethylammonium, triethylammonium); hydrazino groups having $C_{0-15}$, preferably $C_{1-10}$, more preferably $C_{1-6}$ (e.g., trimethylhydrazino); ureido groups having $C_{1-15}$, preferably $C_{1-10}$, more preferably $C_{1-6}$ (e.g., ureido, N,N-dimethylureido); imido groups having $C_{1-15}$, preferably $C_{1-10}$, more preferably $C_{1-6}$ (e.g., succinimide); alkylthio groups having $C_{1-20}$, preferably $C_{1-12}$, more preferably $C_{1-8}$ (e.g., methylthio, ethylthio, propylthio); arylthio groups having $C_{6-80}$, preferably $C_{6-40}$, more preferably $C_{6-30}$ (e.g., phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trifluoromethylphenylthio, 3-trifluoromethylphenylthio, 2-pyridylthio, 1-naphtylthio, 2-naphtylthio, 4-propylcyclohexyl-4'-biphenylthio, 4-butylcyclohexyl-4'-biphenylthio, 4-pentylcycloxexyl-4'-biphenylthio, 4-propylphenyl-2-ethynyl-4'-biphenyltio); heteroarylthio groups having $C_{1-80}$, preferably $C_{1-40}$, more preferably $C_{1-30}$ (e.g., 2-pyridylthio, 3-pyridylthio, 4-pyridylthio, 2-quinolylthio, 2-furylthio, 2-pyrrolylthio); alkoxycarbonyl groups having $C_{2-20}$, preferably $C_{2-12}$, more preferably $C_{2-8}$ (e.g., methoxycarbonyl, ethoxycarbonyl, 2-benzyloxycarbonyl); aryloxycarbonyl groups having $C_{6-20}$ preferably $C_{6-12}$, more preferably $C_{6-10}$ (e.g., phenoxycarbonyl); unsubstituted alkyl groups having $C_{1-28}$, preferably $C_{1-20}$, more preferably $C_{1-15}$ (e.g., methyl, ethyl, propyl, butyl); substituted alkyl groups having $C_{1-28}$, preferably $C_{1-20}$, more preferably $C_{1-15}$ {e.g., hydroxymethyl, trifluoromethyl, benzyl, carboxyethyl, ethoxycarbonylmethyl, acethylaminomethyl, also including unsaturated hydrocarbon groups having $C_{2-18}$, preferably $C_{3-10}$, more preferably $C_{3-5}$ (e.g, vinyl, ethynyl, 1-cyclohexyenyl, benzylidyne, benzyliden); substituted or unsubstituted aryl groups having $C_{6-20}$, preferably $C_{6-15}$, more preferably $C_{6-10}$ (e.g., phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, 4-propylphenyl-2-ethynyl-4'-biphenyl); and substituted or unsubstituted heterocyclic groups having $C_{1-20}$, preferably $C_{2-10}$, more preferably $C_{4-6}$ (e.g., pyridyl, 5-methylpyridyl, thienyl, furyl, morpholino, tetrahydrofurfuryl).

Structures having condensed benzene rings or naphthalene rings are also allowable. Any substituents selected from above Substituent Group V may be substituted by any substituents selected from above Substituent Group V.

The substituent represented by $R^1$, $R^2$, $R^3$, $R^4$, $R^5$, $R^6$ or $R^7$ is preferably selected from the group consisting of a substituted or non-substituted alkyl group, a substituted or non-substituted aryl group, a substituted or non-substituted heteroaryl group, a substituted or non-substituted alkoxy group, a substituted or non-substituted aryloxy group, a halogen atom, an amino group, a substituted amino group, a hydroxy group, a substituted or non-substituted alkylthio group and a substituted or non-substituted arylthio group described above. The substituent represented by $R^1$, $R^2$, $R^5$ or $R^6$ is more preferably selected from the group consisting of a substituted or non-substitute alkyl group, a substituted or non-substituted aryl group, a substituted or non-substituted heteroaryl group and a substituted or non-substituted arylthio group described above. The substituent represented by $R^3$, $R^4$ or $R^7$ is more preferably selected from the group consisting of an amino group, a substituted amino group, a hydroxy group, a substituted or non-substituted alkylthio group and a substituted or non-substituted arylthio group described above.

At least one of $R^1$, $R^2$, $R^5$ and $R^6$ represents a substituted or non-substituted alkyl group, cycloalkyl group, aryl group or heteroaryl group. Preferred examples of the alkyl group, the aryl group or the heteroaryl group are respectively same as those described above. It is preferred that at least one of $R^1$, $R^2$, $R^5$ and $R^6$ represents a substituted or non-substituted $C_{1-28}$, more preferably $C_{1-20}$ and much more preferably $C_{1-15}$, alkyl group such as butyl, pentyl, hexyl, heptyl and octyl; or a substituted or non-substituted $C_{6-20}$, more preferably $C_{6-15}$ and much more preferably $C_{6-10}$, aryl group such as phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl and 4-propylphenyl-2-ethynyl-4'-biphenyl.

The some preferred examples of $R^1$, $R^2$, $R^5$ and $R^6$ are described below.

(1) $R^2$ and $R^5$ are hydrogen atoms, and $R^1$ and $R^6$ respectively represent a substituted or non-substituted alkyl group, cycloalkyl group, aryl group or heteroaryl group;

(2) $R^2$ and $R^6$ are hydrogen atoms, and $R^1$ and $R^5$ respectively represent a substituted or non-substituted alkyl group, cycloalkyl group, aryl group or heteroaryl group;

(3) $R^1$ and $R^6$ are hydrogen atoms, and $R^2$ and $R^5$ respectively represent a substituted or non-substituted alkyl group, cycloalkyl group, aryl group or heteroaryl group;

(4) $R^2$ is a hydrogen atom, and $R^1$, $R^5$ and $R^6$ respectively represent a substituted or non-substituted alkyl group, cycloalkyl group, aryl group or heteroaryl group;

(5) $R^2$, $R^5$ and $R^6$ are hydrogen atoms, and $R^1$ represents a substituted or non-substituted alkyl group, cycloalkyl group, aryl group or heteroaryl group;

(6) $R^2$, $R^1$ and $R^6$ are hydrogen atoms, and $R^5$ represents a substituted or non-substituted alkyl group, cycloalkyl group, aryl group or heteroaryl group; or (7) $R^2$, $R^1$ and $R^5$ are hydrogen atoms, and $R^6$ represents a substituted or non-substituted alkyl group, cycloalkyl group, aryl group or heteroaryl group.

Among the embodiments of (1) to (7), the embodiments of (3) and (6) are more preferred.

In the formula, $B^1$ and $B^2$ respectively represent a substituted or non-substituted arylene group, heteroarylene group or divalent cyclic aliphatic hydrocarbon group.

The arylene group is preferably selected from substituted or non-substituted $C_{6-20}$ arylene groups, and preferred examples of the arylene group include a substituted or non-substituted phenylene group, naphthylene group and anthracene-diyl group. Substituted or non-substituted phenylene groups are more preferred, and 1,4-pehylene is much more preferred.

The heteroarylene group represented by $B^1$ or $B^2$ is preferably selected from substituted or non-substituted $C_{1-20}$ heteroarylene groups, and preferred examples of the heteroarylene group include a substituted or non-substituted pyridine-diyl group, quinoline-diyl group, isoquinoline-diyl group, pyrimidine-diyl group, pyrazine-diyl group, thiophene-diyl group, furan-diyl group, oxazole-diyl group, thiazole-diyl, imidazole-diyl group, pyrazole-diyl group, oxadiazole-diyl group, thiadiazole-diyl group, triazole-diyl group and condensed heteroarylene groups thereof.

The divalent cyclic aliphatic hydrocarbon group represented by $B^1$ or $B^2$ is preferably selected from the group consisting of a substituted or non-substituted cyclohexane-1,2-diyl group, cyclohexane-1,3-diyl group, cyclohexane-1,4-diyl group and cyclopentane-1,3-diyl group, and among these, a substituted or non-substitute (E)-cyclohexane-1,4-diyl is especially preferred.

The arylene group, heteroarylene group or divalent cyclic aliphatic hydrocarbon group represented by $B^1$ or $B^2$ may have at least one substituent. The substituent may be selected from Substituent Group V described above.

$Q^1$ represents a divalent linking group. $Q^1$ represents a linking group which may include one or more carbon atoms, nitrogen atoms, sulfur atoms or oxygen atoms. The preferred examples of the linking group represented by $Q^1$ include substituted or non-substituted alkylene groups having $C_{1-20}$ (e.g., methylene, ethylene, propylene, butylenes, pentylene, cyclohexyl-1,4-diyl), substituted or non-substituted alkenylene groups having $C_{2-20}$ (e.g., ethenylene), alkynylene groups having $C_{2-20}$ (e.g., ethynylene), amide (—C(=O)NH—), ether group (—O—), ester group (—C(=O)O—), sulfoamide (—S(=O)$_2$NH—), sulfonic ester group (—S(=O)$_2$O—), ureido (—NHC(=O)NH—), sulfonyl (—S(=O)$_2$—), sulfinyl (—S(=O)—), thioether (—S—), carbonyl (—C(=O)—), —NR— (R represents a hydrogen atom, alkyl group or aryl group), azo (—N=N—), azoxy (—N$_2$(O)—), heterocyclo-diyl group (e.g., piperazine-1,4-diyl), and the groups having $C_{0-60}$, which is composed by two or more groups selected from above-mentioned examples.

It is preferred that $Q^1$ represents an alkylene group, an alkenylene group, an alkynylene group, an ether group, a thioether group, an amide group, an ester group, a carbonyl group and any combinations thereof.

$Q^1$ may have at least one substituent selected from Substituent Group V.

$C^1$ represents a substituted or non-substituted alkyl group, cycloalkyl group, alkoxy group, alkoxycarbonyl group, acyl group or acyloxy group. Preferred examples of $C^1$ include substituted or non-substituted alkyl or cycloalkyl groups having $C_{1-30}$, preferably $C_{1-12}$, more preferably $C_{1-8}$ (e.g., methyl, ethyl, propyl, butyl, t-butyl, i-butyl, s-butyl, pentyl, t-pentyl, hexyl, heptyl, octyl, cyclohexyl, 4-methycyclohexyl, 4-ethylcyclohexyl, 4-propylcyclohexyl, 4-butylcyclohexyl, 4-pentylcyclohexyl, hydroxymethyl, trifluoromethyl, benzyl); substituted or non-substituted alkoxy groups having $C_{1-20}$, preferably $C_{2-12}$, more preferably $C_{2-8}$ (e.g., methoxy, ethoxy, 2-methoxyethoxy, 2-phenylethoxy); substituted or non-substituted acyloxy groups having $C_{1-20}$, preferably $C_{2-12}$, more preferably $C_{2-8}$ (e.g., acethyloxy, benzoyloxy); substituted or non-substituted acyl groups having $C_{1-30}$, preferably $C_{1-12}$, more preferably $C_{1-8}$ (e.g., substituted or non-substituted acetyl, formyl, pivaloyl, 2-chloroacetyl, stearoyl, benzoyl, p-n-octyloxyphenyl carbonyl); and substituted or non-substituted alkoxycarbonyl groups having $C_{2-20}$, preferably $C_{2-12}$, more preferably $C_{2-8}$ (e.g., methoxycarbonyl, ethoxycarbonyl, 2-benzyloxycarbonyl). $C^1$ is more preferably a substituted or on-substituted alkyl or alkoxy, and further more preferably ethyl, propyl, butyl, pentyl, hexyl or trifuluoromethoxy.

$C^1$ may have at least one substituent selected from Substituent Group V.

In the formula, p, q and r respectively represent an integer from 0 to 5 and n is an integer from 1 to 3, provided that (p+r)×n is from 3 to 10. When p, q or r is 2 or more, plural $B^1$, $Q^1$ or $B^2$ may be same or different each other; and when n is 2 or more, plural $\{(B^1)_p\text{-}(Q^1)_q\text{-}(B^2)_r\}$ may be same or different each other.

Preferred combinations of p, q, r and n are (i) to (X) as shown below:

(i) p=3, q=0, r=0 and n=1;
(ii) p=4, q=0, r=0 and n=1;
(iii) p=5, q=0, r=0 and n=1;
(iv) p=2, q=0, r=1 and n=1;
(v) p=2, q=1, r=1 and n=1;
(vi) p=1, q=1, r=2 and n=1;
(vii) p=3, q=1, r=1 and n=1;
(viii) p=2, q=0, r=2 and n=1;
(ix) p=1, q=1, r=1 and n=2; or
(x) p=2, q=1, r=1 and n=2.

Especially preferred combinations are (i) p=3, q=0, r=0 and n=1; iv) p=2, q=0, r=1 and n=1; and (v) p=2, q=1, r=1 and n=1.

The substituent represented by the formula of —$\{(B^1)_p\text{-}(Q^1)_q\text{-}(B^2)_r\}_n$—$C^1$ preferably contain a moiety exhibiting liquid crystallinity. The moiety may exhibit any kind of liquid crystallinity, however, preferably nematic, smectic, or discotic liquid crystallinity, and more preferably nematic liquid crystallinity. Examples of structures exhibiting liquid crystals are shown in "Bunshikouzou to ekishosei (Molecular Structure and Liquid Crystallinity)", third chapter of "Ekisho Binran (Handbook of Liquid Crystal)" published by Maruzen in 2000, edited by Society of editing handbook of Liquid crystal.

It is preferred that the dichroic dye used in the invention has at least one substituent of —$\{(B^1)_p\text{-}(Q^1)_q\text{-}(B^2)_r\}_n$—$C^1$. A number of substituent "—$\{(B^1)_p\text{-}(Q^1)_q\text{-}(B^2)_r\}_n$—$C^1$" contained in the dichroic dye may be 1 to 8, is preferably 1 to 4, and more preferably 1 or 2.

One of preferred examples of the substituent represented by —$\{(B^1)_p\text{-}(Q^1)_q\text{-}(B^2)_r\}_n$—$C^1$ is a substituent represented by the formula in which $B^1$ is a substituted or non-substituted arylene or heteroarylene group, $B^2$ is a cyclohexane-1,4-diyl group, $C^1$ is a substituted or non-substituted alkyl group, p=2, q=0, r=1 and n=1; and another preferred example of the substituent is a substituent represented by the formula in which $B^1$ is a substituted or non-substituted arylene or heteroarylene group, $B^2$ is a cyclohexane-1,4-diyl group, $C^1$ is a substituted or non-substituted alkyl group, p=1, q=0, r=2 and n=1. One of especially preferred examples of the substituent is a substituent represented by a formula (a-1) shown below, or, in other words, a substituent represented by the formula in which $B^1$ is a substituted or non-substituted 1,4-phenylen group, $B^2$ is a trans-cyclohexyl group, $C^1$ is a substituted or non-substituted alkyl group (preferably methyl, ethyl, propyl, butyl, pentyl or hexyl), p=2, q=0, r=1 and n=1; and another especially preferred example of the substituent is a substituent represented by a formula (a-2), or, in other words, a substituent represented by the formula in which $B^1$ is a substituted or non-substituted 1,4-phenylene group, $B^2$ is a trans-cyclohexane-1,4-diyl group, $C^1$ is a substituted or non-substituted alkyl group (preferably methyl, ethyl, propyl, butyl, pentyl or hexyl), p=1, q=0, r=2 and n=1.

Formula (a-1)

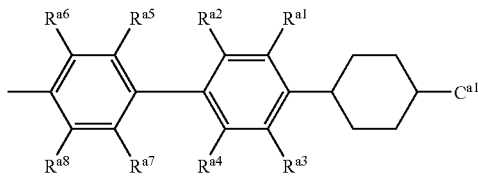

Formula (a-2)

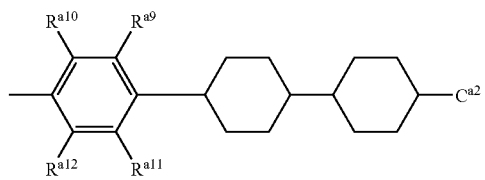

In the formulae, $R^{a1}$ to $R^{a12}$ respectively represent a hydrogen atom or a substituent. The substituent is selected from Substituent Group V described above. It is preferred that $R^{a1}$ to $R^{a12}$ respectively represent a hydrogen atom, a halogen atom (preferably fluorine atom), a substituted or non-substituted alkyl group, a substituted or non-substituted aryl group or a substituted or non-substituted alkoxy group.

In the formulae, $C^{a1}$ and $C^{a2}$ respectively represent a substituted or non-substituted alkyl group, and preferably methyl, ethyl, propyl, butyl, pentyl or hexyl.

Examples of the anthraquinone dichroic dye, which can be used in the invention, include, however not to be limited to, Compound Nos. 1-1 to 1-18.

No. 1-1

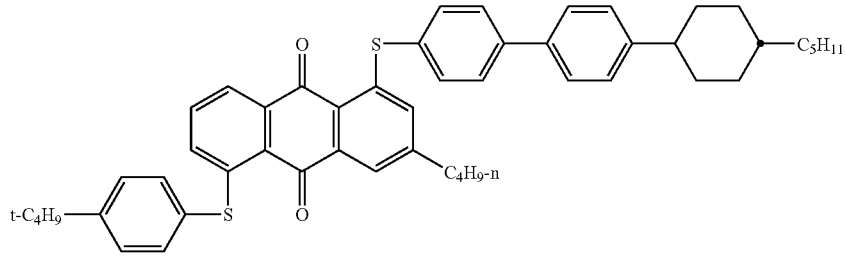

No. 1-2

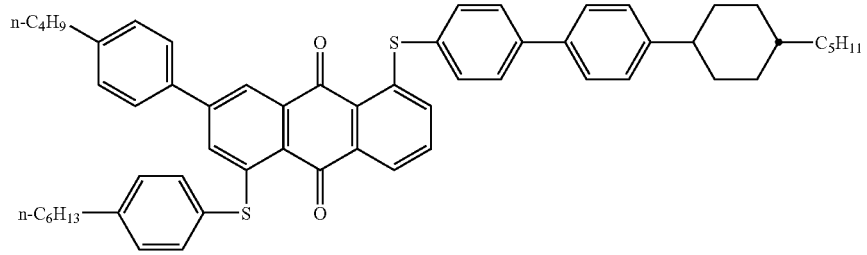

No. 1-3

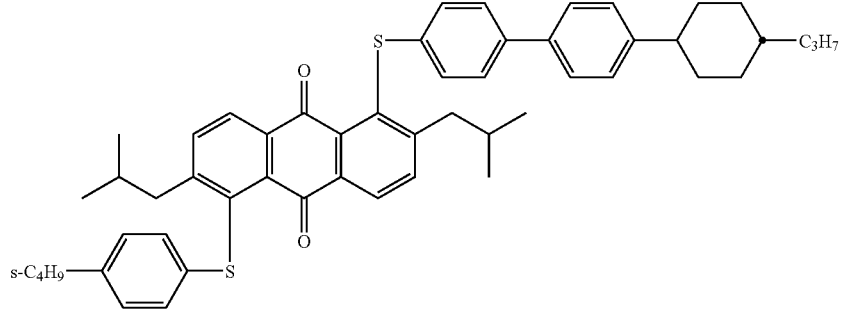

-continued
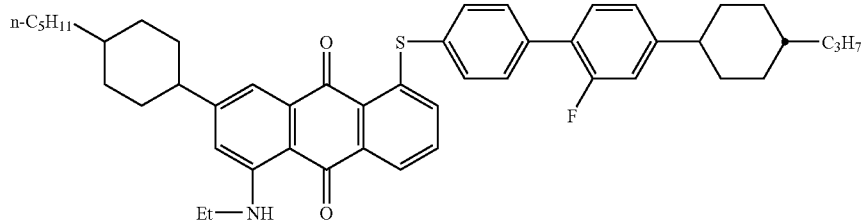
No. 1-4
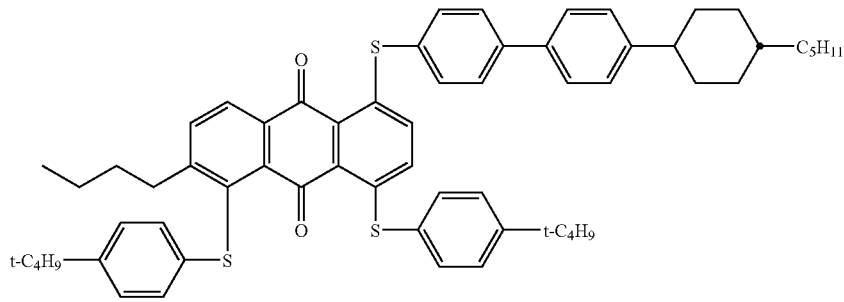
No. 1-5
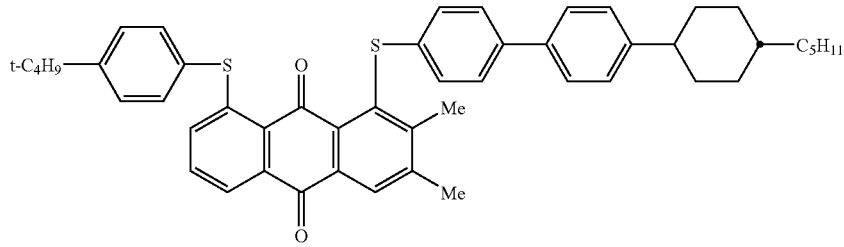
No. 1-6
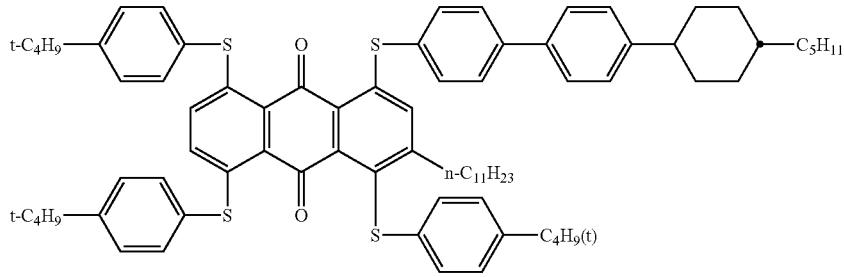
No. 1-7
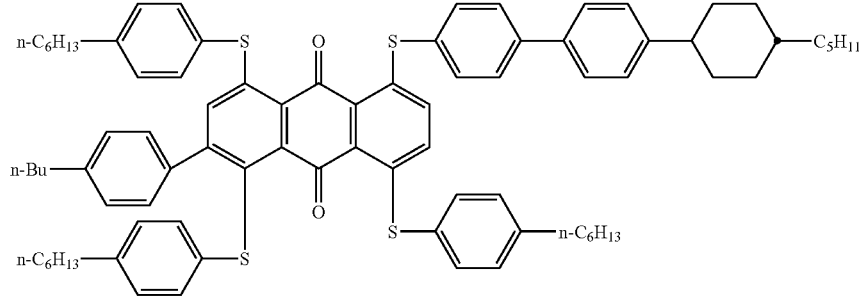
No. 1-8

-continued
No. 1-9
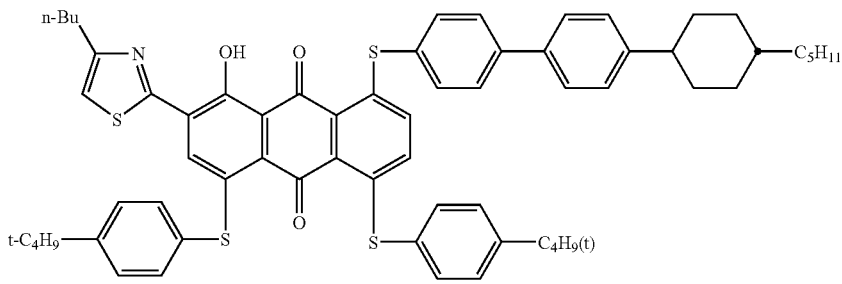
No. 1-10
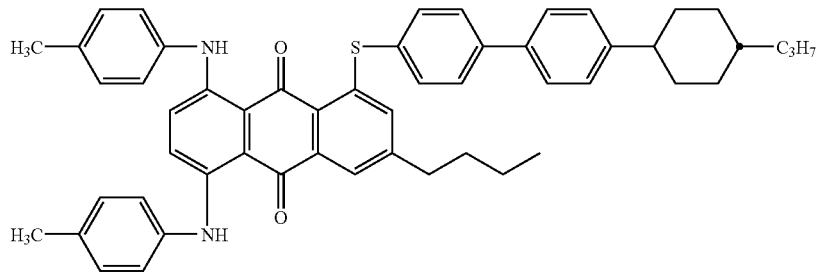
No. 1-11
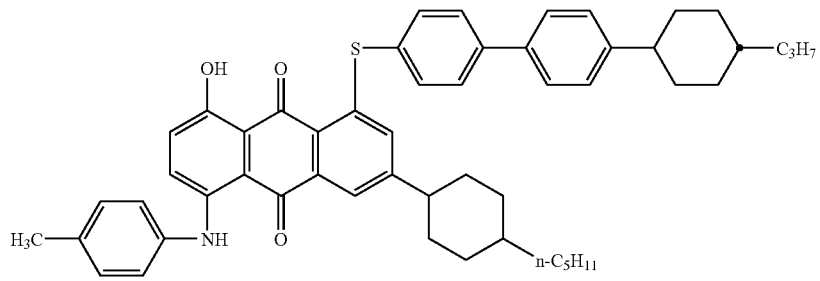
No. 1-12
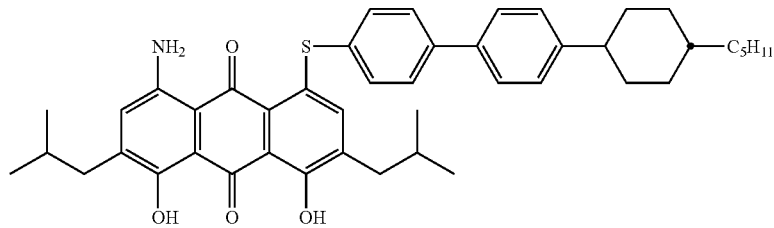
No. 1-13
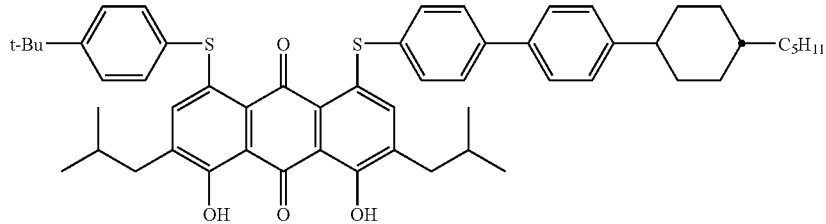
No. 1-14
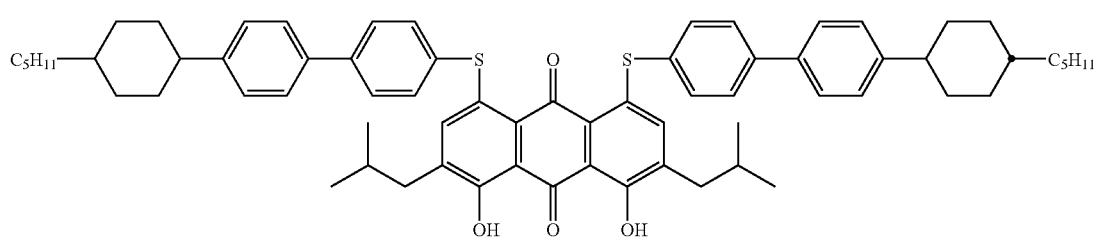

-continued
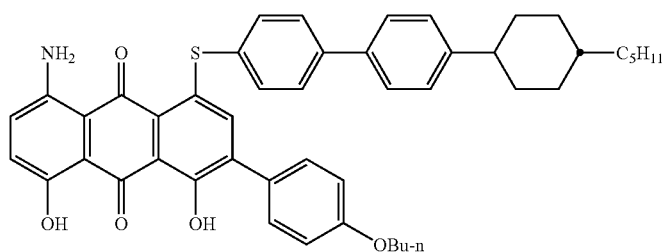
No. 1-15
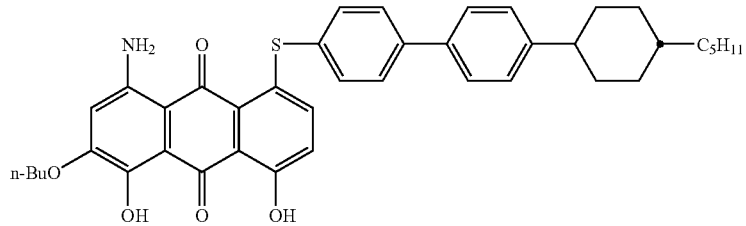
No. 1-16
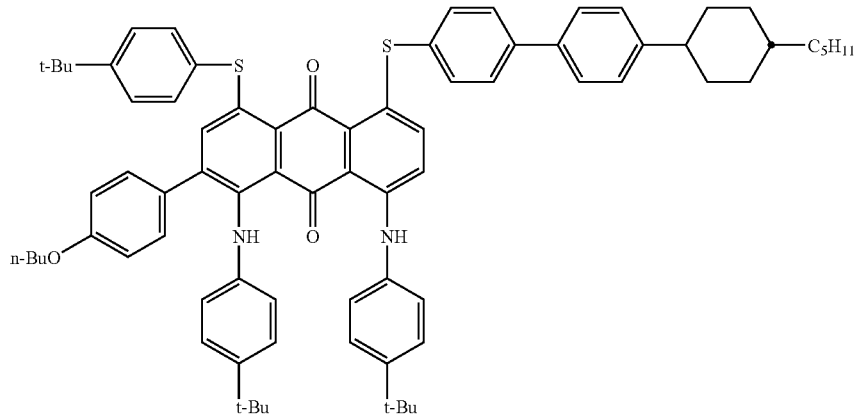
No. 1-17
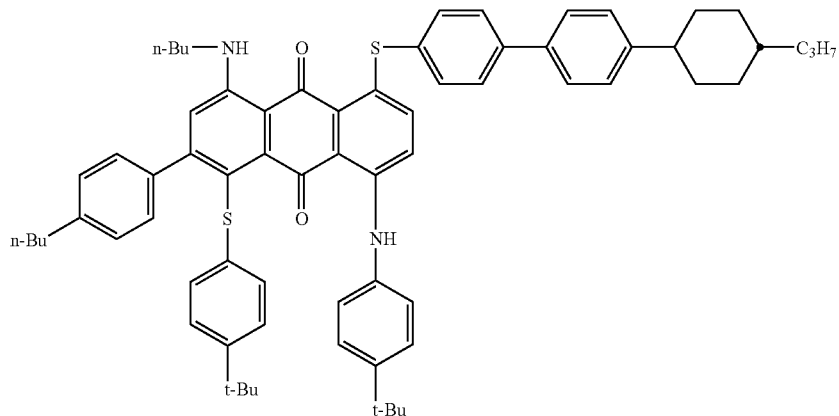
No. 1-18

The compounds represented by the formula (1) can be produced according to combinations of known processes. For example, the compounds can be produces according to the process described in JPA No. 2003-192664 or the like.

The composition of the present invention comprises host liquid crystal. In the specification, "host liquid crystal" means a compound (or a mixture of two or more types of compounds) whose molecules change their alignment states depending on applied electric field, to thereby control the alignment states of dichroic dye represented by the formula (1), which are dissolved in it.

According to the present invention, any liquid crystal can be used as host liquid crystal providing it can coexist with the dichroic dye. The host liquid crystal is preferably selected from liquid crystal compounds exhibiting a nematic phase or a smectic phase, and more preferably selected from liquid crystal compounds exhibiting a nematic phase. Examples of the nematic liquid crystal, which can be used in the present invention, include azomethine compounds, cyanobiphenyl compounds, cyanophenyl esters, fluorine-substituted phenyl esters, cyclohexane carboxylic acid phenyl esters, fluorine-substituted cyclohexane carboxylic acid phenyl esters, cyanophenyl-cyclohexanes, fluorine-substituted phenyl-cyclohexanes, cyano-substituted phenyl pyrimidines, fluorine-substituted phenyl pyrimidines, alkoxy-substituted phenyl pyrimidines, fluorine-alkoxy-substituted phenyl pyrimidines, phenyl dioxanes, tolans(diphenylacetylenes), fluorine-substituted tolans(fluorine-substituted diphenylacetylenes) and alkenyl cyclohexyl benzonitriles. Available examples of host liquid crystal are found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 154-192, and p. 715-722. The fluorine-substituted liquid crystal such as ZLI-4692, MLC-6267, 6284, 6287, 6288, 6406, 6422, 6423, 6425, 6435, 6437, 7700, 7800, 9000, 9100, 9200, 9300, 10000 (the above are supplied by Merck), LIXON 5036XX, 5037XX, 5039XX, 5040XX, 5041XX, (the above are supplied by Chisso) etc., which is suitable for TFT driving, can be used as host liquid crystal for this invention.

According to the invention, host liquid crystal with positive or negative dielectric anisotropy may be used.

For the embodiments of the present invention employing host liquid crystal with a positive dielectric anisotropy, applied no electric field, host liquid crystal molecules are aligned homogenously, and, thus, dichroic dye molecules are aligned homogenously, to thereby absorb light. Applied electric field, host liquid crystal molecules are made to be aligned vertically, and, thus, dichroic dye molecules are aligned vertically, to thereby transmit light. Namely, applied electric field, the embodiments are in a white state, and, applied no electric field, the embodiments are in a black state.

For the embodiments of the present invention employing host liquid crystal with a negative dielectric anisotropy, applied no electric field, host liquid crystal molecules are aligned vertically, and, thus, dichroic dye molecules are aligned vertically, to thereby transmit light. Applied electric field, host liquid crystal molecules are made to be aligned homogenously, and, thus, dichroic dye molecules are aligned homogenously, to thereby absorb light. Namely, applied no electric field, the embodiments are in a white state, and, applied electric field, the embodiments are in a black state.

Liquid crystal with a negative dielectric anisotropy may have a molecular structure such that its dielectric anisotropy increases in the direction of the short axis of the liquid crystal molecule. Examples of such liquid crystal include those described in "Monthly Display" published in 2000, vol. 4, pp. 4 to 9; and those described in "Syn Lett"., Vol. 4, pp. 389 to 396, 1999. Among those, from the viewpoint of voltage retention, liquid crystal, with negative dielectric anisotropy having a fluorine-containing substituent is preferred. Examples of such liquid crystal include MLC-6608, 6609 and 6610 manufactured by Merck.

The liquid crystal composition of the present invention may be added with a compound showing no liquid crystalline property in order to adjust physical properties of the host liquid crystal (typically in order to adjust the temperature range, in which the liquid crystal phase appears, to a desirable range). It is also allowable to add other compounds such as chiral compound, UV absorber and antioxidant. Typical examples thereof relate to chiral agents for twisted-nematic (TN) and super-twisted-nematic (STN) liquid crystals, which can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 199-202.

While there is no specific limitation on the content of the host liquid crystal and the dichroic dye, the content of the dichroic dye (the content of all types of dichroic dye, when a mixture is used as dichroic dye) is preferably 0.1 to 15 wt %, and more preferably 0.5 to 6 wt % with respect to the content of host liquid crystal. It is preferred that a dye concentration required to give a preferred optical concentration is decided based on a measurement of absorption spectra of the liquid crystal element of the present invention.

The dichroic dye of the present invention may be dissolved in host liquid crystal by mechanical stirring, heating, ultrasonic sound or any combination thereof.

The present invention also relates to a liquid crystal element, especially liquid crystal display element, comprising a liquid crystal layer formed of the composition of the present invention. One embodiment of the present invention comprises a pair of electrode substrates and a liquid crystal layer sandwiched between such electrode substrates, which contains the liquid crystal composition of the present invention. The electrode substrate generally comprises a glass substrate or plastic substrate, and an electrode layer formed thereon. Materials available for composing the plastic substrate include acryl polymer, polycarbonate polymer, epoxy polymer, PES, PET or PEN. Available examples of such substrate are typically found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 218-231. The electrode layer formed on the substrate is preferably a transparent electrode layer. Materials available for composing such electrode layer include indium oxide, indium tin oxide (ITO), tin oxide and so forth. Available examples of the transparent electrode are typically found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 232-239.

The liquid crystal element of the present invention can be fabricated by opposing a pair of substrates at a distance of 1 to 50 μm as being typically interposed with a spacer, and filling the liquid crystal composition of the present invention in the space formed between such substrates. Available examples of the spacer can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989), p.

257-262. The liquid crystal composition of the present invention can be disposed between the substrates by coating or printing on the substrate.

The liquid crystal cell of the present invention can be driven based on simple matrix driving system or active matrix driving system using thin film transistors (TFT) or the like. Examples of the driving systems applicable to the liquid crystal cell of the present invention can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989), p. 387-460.

The liquid crystal element of the present invention may employ the composition comprising two or more types of dichroic dye. The color of the composition is not to be limited. Plural dichroic dye may be mixed to give a black liquid crystal composition. And the liquid crystal element employing the black composition may work as an optical shutter in the manner that, applied electric field, black turn into white or white turn into black.

The liquid crystal element of the present invention may employ red, green and blue liquid-crystal compositions. The liquid crystal element comprising the three layers, respectively formed of the red, green or blue liquid crystal composition, disposed on a plane in parallel with each other, may work as a color display.

The liquid crystal element of the present invention may have a multilayer structure. Examples of such element include the element comprising three stacked layers, respectively formed of a yellow, magenta or cyan liquid crystal composition; and the element comprising two stacked layers, one of which is formed of a black liquid crystal composition and another of which is a layer consists of three layers, respectively formed of a red, green or blue liquid crystal composition, disposed on a plane in parallel with each other.

The liquid crystal element of the present invention may be used as a display element in computers, watches, electronic calculators or the like, or used as electron optical devices such as electron optical shutters, electron optical apertures, light path switches in optical communications and light modulators.

EXAMPLES

The following examples further illustrate the present invention. The materials, reagents, amounts and proportions thereof, procedures or the like shown in the following examples can be appropriately changed without departing from the spirit of the present invention. Therefore, the scope of the present invention is not limited to the specific examples shown below.

Synthesis of Dye No. 1-14

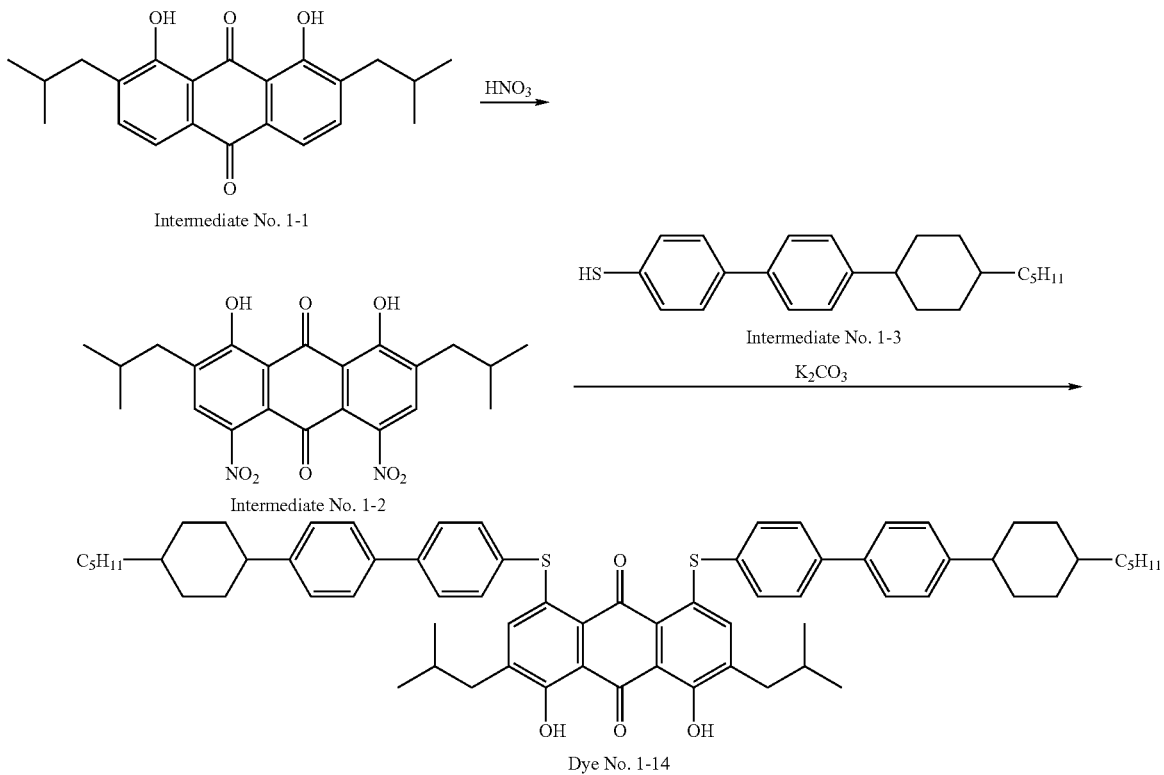

Intermediate No. 1-1

Intermediate No. 1-3

Intermediate No. 1-2

Dye No. 1-14

Intermediate No. 1-1 was synthesized from 1.8-hydroxyanthoraquinone (manufactured by TOKYO KASEI KOGYO Co., LTD.) and isopropyl aldehyde (manufactured by TOKYO KASEI KOGYO Co., LTD.) according to the process described in Bull. Soc. Chim. Fr., Vol. 3, pp. 1545, 1936. Intermediate No. 1-3 was synthesized according to the process described in JPA No. 2003-192664.

Synthesis of Intermediate No. 1-2

To a mixture of 20 g of fuming sulfuric acid and 15 ml of sulfuric acid, 2.8 g of boric acid was added to give a reaction solution, and after the reaction solution was heated up to 50° C., 5.0 g of Intermediate No. 1-1 was added to the reaction solution under stirring. After the reaction solution was cooled down to 20° C., and a mixture of 2.5 ml of nitric acid and 3.4 ml of sulfuric acid was added dropwise to the reaction solution. After being stirred for 2 hours, the reaction solution was poured into water to give a crude crystal, and the crude crystal was obtained by filtration. The obtained crude crystal was recrystallized with dioxane to give 4.4 g of target Intermediate No. 1-2 in a 70% yield.

The NMR data of the product were shown below.

H-NMR(CDCl$_3$): 12.5(s, 2H), 7.62(s, 2H), 2.68(d, 4H), 2.0-2.1(m, 2H), 1.0(d, 12H).

Synthesis of Dye No. 1-14

To 10 ml of dimethylformamide, 1.0 g of Intermediate No. 1-2 and 4.6 g of Intermediate No. 1-3 are added, and subsequently, 2.0 g of potassium carbonate was added at room temperature, to give a reaction solution. The reaction solution was heated up to 60° C. and stirred at the temperature for 3 hours. After cooled, the reaction solution was added with dilute hydrochloric acid to give a crude crystal, and the crude crystal was obtained by filtration. The obtained crude crystal was purified by silica gel chromatography (eluent: hexane/chloroform) to give 1.0 g of target Dye No. 1-14.

The NMR data of the product were shown below.

H-NMR(CDCl$_3$):13.1(s, 2H), 7.4-7.7(m, 12H), 7.25(d, 4H), 7.0(s, 2H), 2.6(m, 2H), 2.4(d, 4H), 1.6-2.0(m, 8H), 1.1-1.6(m, 28H), 0.9-1.0(m, 18H).

Synthesis of Dye No. 1-13

After cooled, the reaction solution was added with dilute hydrochloric acid to give a crude crystal, and the crude crystal was obtained by filtration. The obtained crude crystal was purified by silica gel chromatography (eluent: hexane/chloroform) to give 1.5 g of Intermediate No. 1-4.

The NMR data of the product were shown below.

H-NMR(CDCl$_3$):12.9(s, 1H), 12.8(s, 1H), 7.71(d, 2H), 7.55-7.65(m, 4H), 7.5(s, 1H), 7.3(d, 2H), 7.0(s, 1H), 2.7(d, 2H), 2.5-2.6(m, 1H), 2.4(d, 2H), 2.0-2.1(m, 1H), 1.8-1.95(m, 4H), 1.75(m, 1H), 1.2-1.6(m, 11H), 1.55(m, 2H), 1.0(d, 6H), 0.95(t, 3H), 0.80(d, 6H).

Synthesis of Dye No. 1-13

In 20 ml of dimethylformamide, 0.4 g of Intermediate No. 1-4 and 0.28 g of 4-t-butylbenzenethiol were dissolved and, subsequently, 0.23 g of potassium carbonate was added at room temperature, to give a reaction solution. The reaction solution was heated up to 60° C., and stirred for 10 hours at the temperature. After cooled, the reaction solution was added with dilute hydrochloric acid to give a crude crystal, and the crude crystal was obtained by filtration. The obtained crude crystal was purified by silica gel chromatography (eluent: hexane/chloroform) to give 0.34 g of Dye No. 1-13.

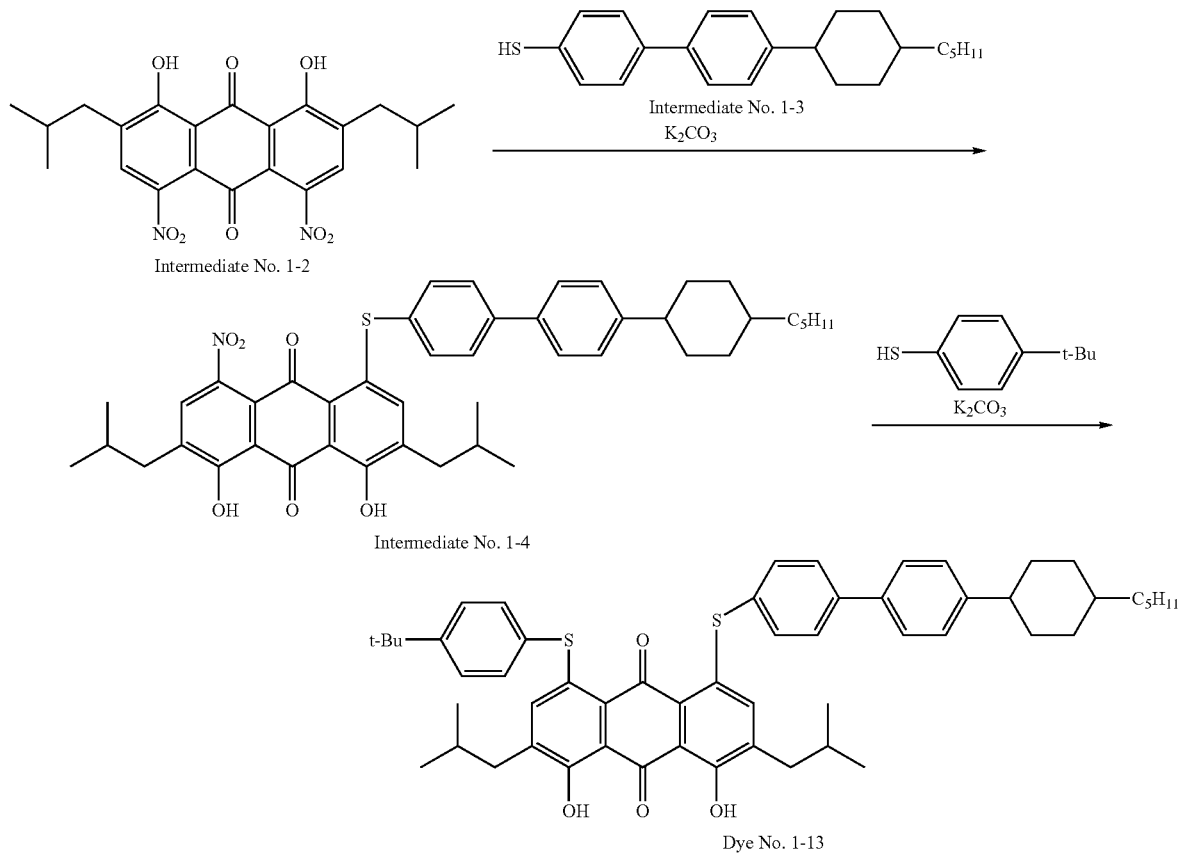

Synthesis of Intermediate No. 1-4

To 5 ml of dimethylformamide, 1.0 g of Intermediate No. 1-2 and 2.3 g of Intermediate No. 1-3 were added and, subsequently, 1.0 g of potassium carbonate was added at room temperature, to give a reaction solution. The solution was heated up to 60° C., and stirred for 3 hours at the temperature.

The NMR data of the product were shown below.

H-NMR(CDCl$_3$):13.1(s, 2H), 7.7(d, 2H), 7.45-7.65(m, 8H), 7.2-3(m, 4H), 7.0(s, 1H), 6.8(s, 1H), 2.5-2.6(m, 1H), 2.4(d, 4H), 2.0(m, 4H), 1.55(s, 9H), 1.2-1.6(m, 13H), 1.3(m, 2H), 1.0(t, 3H), 0.85(d, 12H).

Syntheses of Dye No. 1-15 and Dye No. 1-16

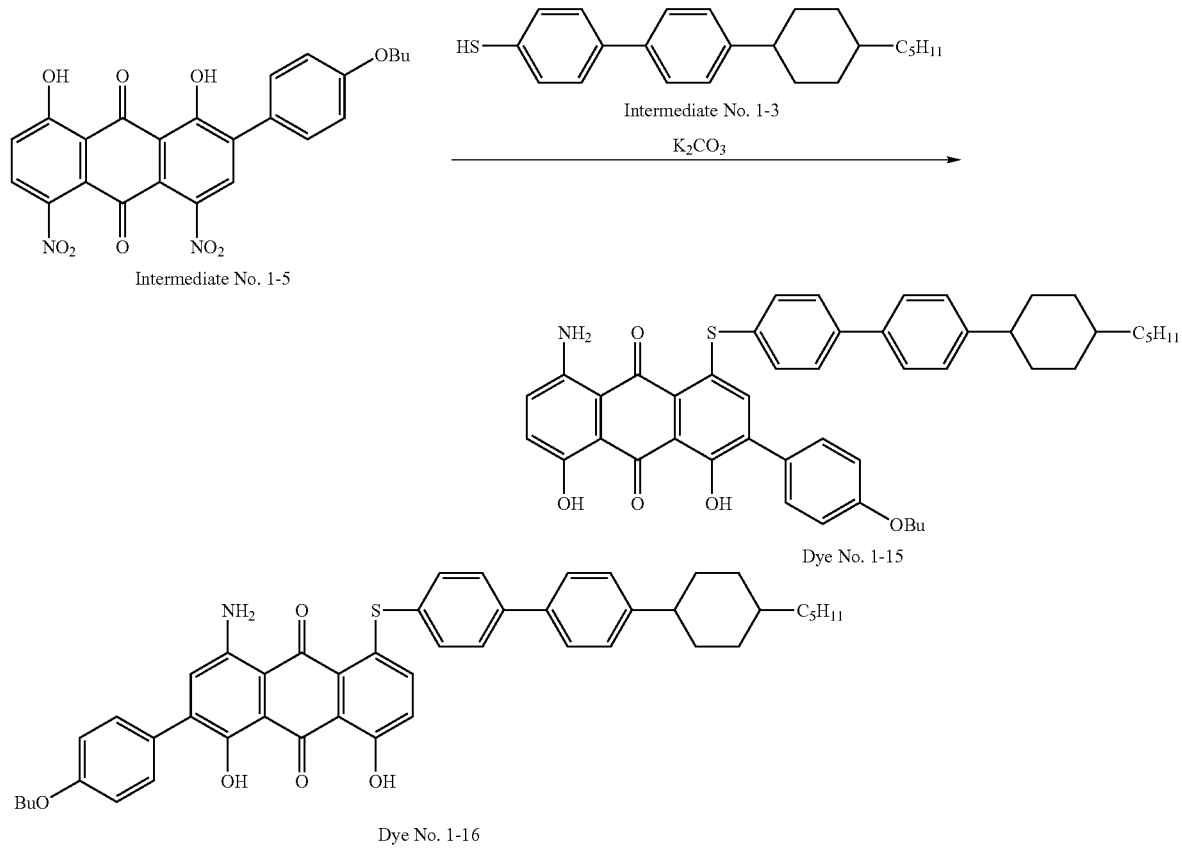

Intermediate No. 1-5 was prepared according to the process described in JPA No. syo 56-100855.

To 30 ml of dimethylformamide, 0.6 g of Intermediate No. 1-5 and 1.2 g of Intermediate No. 1-3 were added, and, subsequently, 0.52 g of potassium carbonate was added at room temperature, to give a reaction solution. The reaction solution was heated up to 60° C. and stirred for 3 hours at the temperature. After cooled, the reaction solution was added with dilute hydrochloric acid to give a crude crystal, and the crude crystal was obtained by filtration. The obtained crude crystal was purified by silica gel chromatography (eluent: hexane/chloroform) to give 0.45 g of mixture of Dye No. 1-15 and Dye No. 1-16.

Example No. 1

In 1 g of host liquid crystal "ZLI-5081" manufactured by Merck Ltd., JAPAN), 20 mg of Dye No. 1-14 was dissolved to give a liquid crystal composition, and the composition was heated with a hot plate of 120° C. for one hour. After cooled down by room temperature, the composition was left for overnight, to give a liquid crystal composition of the present invention.

According to the process described above, several types of compositions were respectively prepared using dyes shown in Table 1. Dyes used for a comparison are shown below.

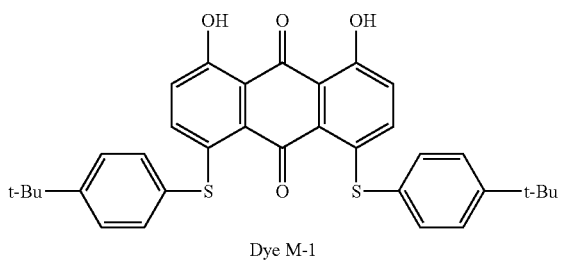

Dye M-1

-continued

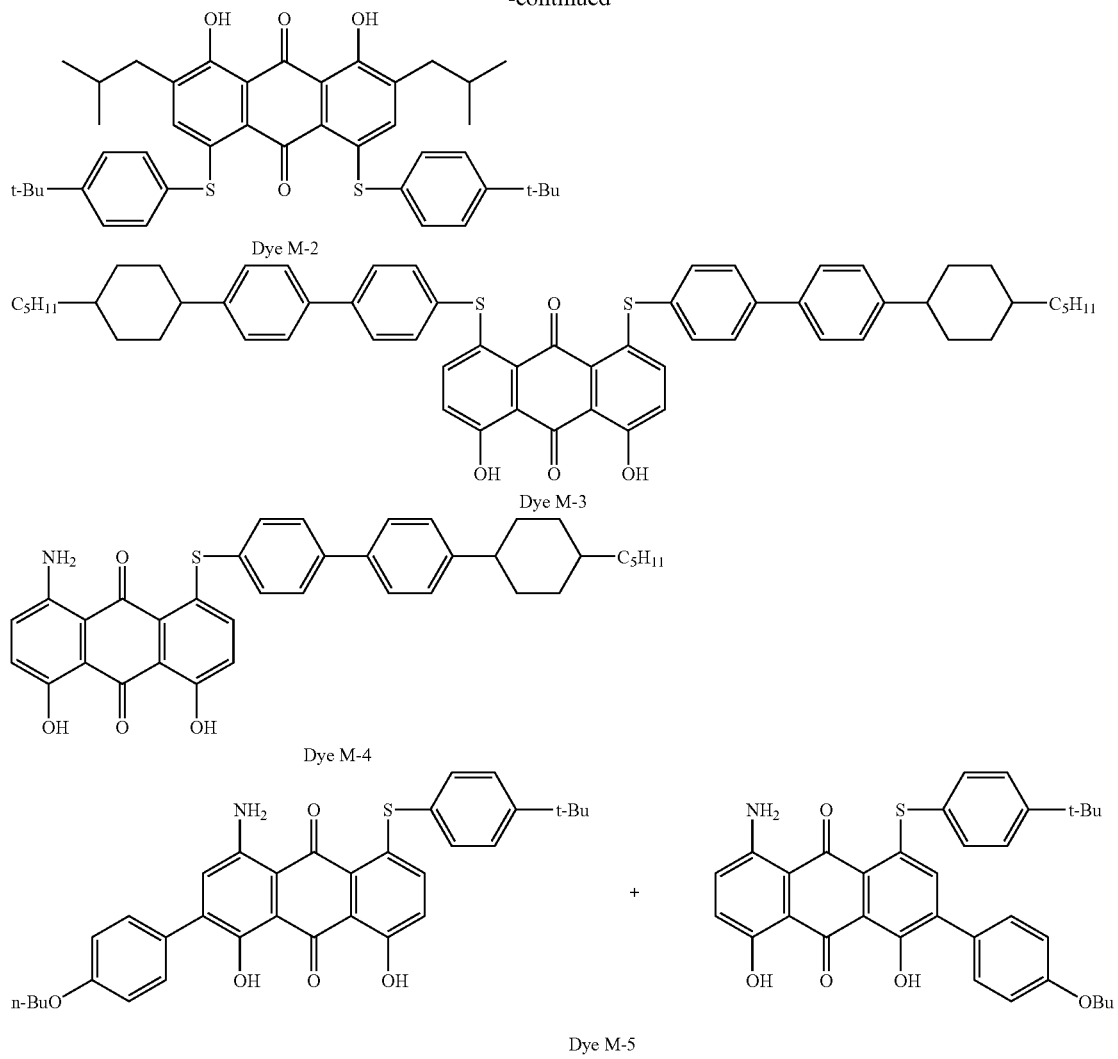

Dye M-2

Dye M-3

Dye M-4

Dye M-5

Productions of Liquid Crystal Elements

The compositions were respectively poured into a liquid crystal cell to form liquid crystal elements. Liquid crystal cells commercially produced by E.H.C., consisting of a pair of a glass substrates having a thickness of 0.7 mm, being disposed such that they faced each other at 8 μm interval and being sealed with epoxy resin; a pair of ITO electrodes each thereon; and a pair of alignment layers formed of polyimide, being rubbed along a parallel alignment at a facing surface respectively; were used.

Measurements of Order Parameters

The produced liquid crystal elements were irradiated with polarized lights parallel or perpendicular to the rubbed direction respectively, and the absorption spectra (A∥ and A⊥) were measured by UV3100 manufactured by Shimazu respectively. Order parameters (S) were respectively calculated by a formula 1 shown below with values of A∥ and A⊥ at a peak absorption wavelength.

$$S=(A\|-A\bot)/(A\|+2\times A\bot)$$   Formula 1

The order parameter (s) and the peak absorption wavelength (λmax) of each sample are shown in Table 1.

| Dye No. | Order parameter | Absorbance | Note |
|---|---|---|---|
| 1-13 | 0.80 | 0.88 | Invention |
| 1-14 | 0.82 | 0.84 | Invention |
| M-1 | 0.70 | 0.24 | |
| M-2 | 0.68 | 0.30 | |
| M-3 | 0.80 | 0.58 | |
| 1-16 | 0.84 | 1.70 | Invention |
| M-4 | 0.78 | 0.58 | |
| M-5 | 0.64 | 0.50 | |

From the results shown in Table 1, it can be understood that the liquid crystal elements respectively employing the composition of the present invention, which comprises a dye represented by the formula (1), respectively give a higher order parameter and a higher absorbance, compared with the elements respectively prepared using the dye other than the formula (1).

Compared among the results of the elements prepared using the comparative dyes, it can be understood that the introduction of a substituent at the 2-position of anthraquinone, or, in other words, the change from Dye M-1 to Dye M-2, contributes to increase in absorbance; and that the introduction of a tricyclic arylthio group, or, in other words, the change from Dye M-1 to Dye M-3, contributes to improvement in order parameter and solubility. It can be also understood that the liquid crystal elements, respectively employing the dye represented by the formula (1), respectively gives both of a higher order parameter and a higher solubility.

Example No. 2

Eight liquid crystal elements were produced in the same manner as Example No. 1, except that host liquid crystal "MLC-6608", manufactured by Merck Ltd., Japan and having a negative dielectric anisotropy, was used in the place of host liquid crystal "ZLI-5081". The order parameters and absorbances of the elements were measured in the same manner as Example No. 1, and the obtained results suggests that the compositions of the present invention respectively give a higher order parameter and a higher absorbance, compared with the comparative compositions; and that the liquid crystal compositions of the present invention respectively give both of a high order parameter and a high solubility.

INDUSTRIAL APPLICABILITY

The composition of the present invention can be used for productions of various types of liquid crystal display elements, and are preferably used for productions of liquid crystal display elements employing a guest-host mode. The liquid crystal display elements respectively produced using the composition of the present invention can give a high displaying quality.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A composition comprising at least one liquid crystal and at least one compound represented by a formula (I):

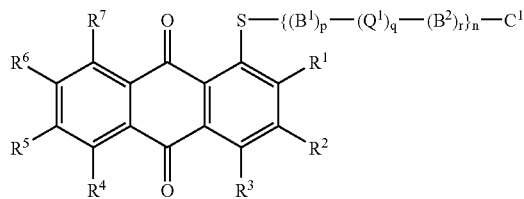

Formula (I)

wherein $R^1$, $R^2$, $R^5$, $R^6$ and $R^7$ respectively represent a hydrogen atom or a substituent, provided that at least one of $R^1$, $R^2$, $R^5$ and $R^6$ represents a substituted or non-substituted alkyl group, cycloalkyl group, aryl group or heteroaryl group; $R^3$ and $R^4$ each represents —OH; S represents a sulfur atom, $B^1$ and $B^2$ respectively represent a substituted or non-substituted arylene group, heteroarylene group or divalent cyclic aliphatic hydrocarbon group; $Q^1$ represents a divalent linking group, $C^1$ represents a substituted or non-substituted alkyl group, cycloalkyl group, alkoxy group, alkoxycarbonyl group, acyl group or acyloxy group; p, q and r respectively represent an integer from 0 to 5 and n is an integer from 1 to 3, provided that (p+r)xn is from 3 to 10; when p, q or r is 2 or more, plural $B^1$, $Q^1$ or $B^2$ may be the same or different from each other; and when n is 2 or more, plural $\{(B^1)_p\text{-}(Q^1)_q\text{-}(B^2)_r\}$ may be the same or different from each other.

2. The composition of claim 1, wherein $\{(B^1)_p\text{-}(Q^1)_q\text{-}(B^2)_r\}\text{-}C^1$ is a substituent represented by a formula (a-1) or a formula (a-2);

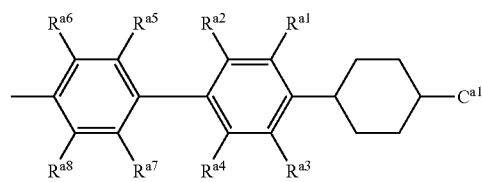

Formula (a-1)

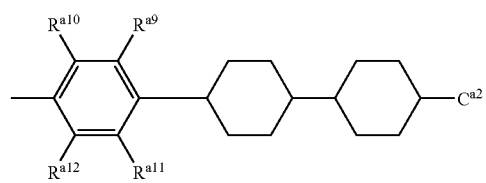

Formula (a-2)

wherein $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

3. The composition of claim 2, wherein $\{(B^1)_p\text{-}(Q^1)_q\text{-}(B^2)_r\}\text{-}C^1$ is a substituent represented by the formula (a-1).

4. The composition of claim 2, wherein $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom, a halogen atom, a substituted or non-substituted alkyl group, a substituted or non-substituted aryl group or a substituted or non-substituted alkoxy group.

5. The composition of claim 2, wherein $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom.

6. The composition of claim 1, wherein $R^2$ and $R^5$ are hydrogen atoms, and $R^1$ and $R^6$ respectively represent a substituted or non-substituted alkyl group, cycloalkyl group, aryl group or heteroaryl group;

$R^2$ and $R^6$ are hydrogen atoms, and $R^1$ and $R^5$ respectively represent a substituted or non-substituted alkyl group, cycloalkyl group, aryl group or heteroaryl group;

$R^1$ and $R^6$ are hydrogen atoms, and $R^2$ and $R^5$ respectively represent a substituted or non-substituted alkyl group, cycloalkyl group, aryl group or heteroaryl group;

$R^2$ is a hydrogen atom, and $R^1$, $R^5$ and $R^6$ respectively represent a substituted or non-substituted alkyl group, cycloalkyl group, aryl group or heteroaryl group;

$R^2$, $R^5$ and $R^6$ are hydrogen atoms, and $R^1$ represents a substituted or non-substituted alkyl group, cycloalkyl group, aryl group or heteroaryl group;

$R^2$, $R^1$ and $R^6$ are hydrogen atoms, and $R^5$ represents a substituted or non-substituted alkyl group, cycloalkyl group, aryl group or heteroaryl group; or $R^2$, $R^1$ and $R^5$ are hydrogen atoms, and $R^6$ represents a substituted or non-substituted alkyl group, cycloalkyl group, aryl group or heteroaryl group.

7. The composition of claim 1, wherein
R¹ and R⁶ are hydrogen atoms, and R² and R⁵ respectively represent a substituted or non-substituted alkyl group, cycloalkyl group, aryl group or heteroaryl group; or
R², R¹ and R⁶ are hydrogen atoms, and R⁵ represents a substituted or non-substituted alkyl group, cycloalkyl group, aryl group or heteroaryl group.

8. The composition of claim 1, wherein R¹, R², R⁵, R⁶ and R⁷ respectively represent a hydrogen atom or a substituent selected from the group consisting of a substituted or non-substituted alkyl group, a substituted or non-substituted aryl group, a substituted or non-substituted heteroaryl group, a substituted or non-substituted alkoxy group, a substituted or non-substituted aryloxy group, a halogen atom, an amino group, a substituted amino group, a hydroxy group, a substituted or non-substituted alkylthio group and a substituted or non-substituted arylthio group.

9. The composition of claim 1, wherein R¹, R², R⁵ and R⁶ respectively represent a hydrogen atom or a substituent selected from the group consisting of a substituted or non-substituted alkyl group, a substituted or non-substituted aryl group, a substituted or non-substituted heteroaryl group and a substituted or non-substituted arylthio group; and R⁷ represents a hydrogen atom or a substituent selected from the group consisting of an amino group, a substituted amino group, a hydroxy group, a substituted or non-substituted alkylthio group and a substituted or non-substituted arylthio group.

10. A liquid-crystal element comprising:
a pair of electrodes, at least one of which is a transparent electrode, and
a liquid-crystal cell disposed between the pair of electrodes, and formed of a composition comprising at least one liquid-crystal and at least one compound represented by a formula (I):

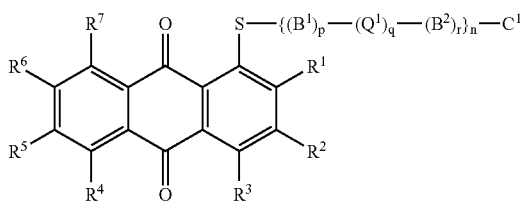

Formula (I)

wherein R¹, R², R⁵, R⁶ and R⁷ respectively represent a hydrogen atom or a substituent, provided that at least one of R¹, R², R⁵ and R⁶ represents a substituted or non-substituted alkyl group, cycloalkyl group, aryl group or heteroaryl group; R³ and R⁴ each represents —OH; S represents a sulfur atom, B¹ and B² respectively represent a substituted or non-substituted arylene group, heteroarylene group or divalent substituted or non-substituted cyclic aliphatic hydrocarbon group; Q¹ represents a divalent linking group, C¹ represents a substituted or non-substituted alkyl group, cycloalkyl group, alkoxy group, alkoxycarbonyl group, acyl group or acyloxy group; p, q and r respectively represent an integer from 0 to 5 and n is an integer from 1 to 3, provided that (p+r)xn is from 3 to 10; when p, q or r is 2 or more, plural B¹, Q¹ or B2 may be the same or different from each other; and when n is 2 or more, plural $\{(B^1)_p\text{-}(Q^1)_q\text{-}(B^2)_r\}$ may be the same or different from each other.

11. The element of claim 10, wherein the liquid crystal is fluorine-containing liquid crystal.

12. The element of claim 10, wherein $\{(B^1)_p\text{-}(Q^1)_q\text{-}(B^2)_r\}$-C¹ is a substituent represented by a formula (a-1) or a formula (a-2);

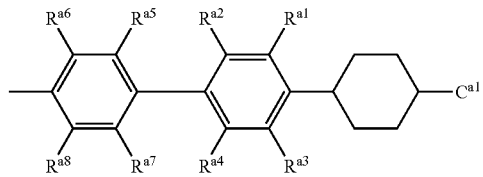

Formula (a-1)

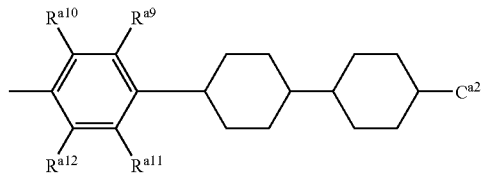

Formula (a-2)

wherein $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

13. The element of claim 12, wherein $\{(B^1)_p\text{-}(Q^1)_q\text{-}(B^2)_r\}$-C¹ is a substituent represented by the formula (a-1).

14. The element of claim 12, wherein $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom, a halogen atom, a substituted or non-substituted alkyl group, a substituted or non-substituted aryl group or a substituted or non-substituted alkoxy group.

15. The element of claim 12, wherein $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom.

16. The element of claim 10, wherein
R² and R⁵ are hydrogen atoms, and R¹ and R⁶ respectively represent a substituted or non-substituted alkyl group, cycloalkyl group, aryl group or heteroaryl group;
R² and R⁶ are hydrogen atoms, and R¹ and R⁵ respectively represent a substituted or non-substituted alkyl group, cycloalkyl group, aryl group or heteroaryl group;
R¹ and 1are hydrogen atoms, and R² and R⁵ respectively represent a substituted or non-substituted alkyl group, cycloalkyl group, aryl group or heteroaryl group;
R² is a hydrogen atom, and R¹, R⁵ and R⁶ respectively represent a substituted or non-substituted alkyl group, cycloalkyl group, aryl group or heteroaryl group;
R², R⁵ and R⁶ are hydrogen atoms, and R¹ represents a substituted or non-substituted alkyl group, cycloalkyl group, aryl group or heteroaryl group;
R², R¹ and R⁶ are hydrogen atoms, and R⁵ represents a substituted or non-substituted alkyl group, cycloalkyl group, aryl group or heteroaryl group; or
R², R¹ and R⁵ are hydrogen atoms, and R⁶ represents a substituted or non-substituted alkyl group, cycloalkyl group, aryl group or heteroaryl group.

17. The element of claim 10, wherein
R¹ and R⁶ are hydrogen atoms, and R² and R⁵ respectively represent a substituted or non-substituted alkyl group, cycloalkyl group, aryl group or heteroaryl group; or $R^2$, $R^1$ and $R^6$ are hydrogen atoms, and $R^5$ represents a substituted or non-substituted alkyl group, cycloalkyl group, aryl group or heteroaryl group.

18. The element of claim 10, wherein $R^1$, $R^2$, $R^5$, $R^6$ and $R^7$ respectively represent a hydrogen atom or a substituent selected from the group consisting of a substituted or non-substituted alkyl group, a substituted or non-substituted aryl group, a substituted or non-substituted heteroaryl group, a substituted or non-substituted alkoxy group, a substituted or non-substituted aryloxy group, a halogen atom, an amino group, a substituted amino group, a hydroxy group, a substituted or non-substituted alkylthio group and a substituted or non-substituted arylthio group.

19. The element of claim 1, wherein $R^1$, $R^2$, $R^5$ and $R^6$ respectively represent a hydrogen atom or a substituent selected from the group consisting of a substituted or non-substituted alkyl group, a substituted or non-substituted aryl group, a substituted or non-substituted heteroaryl group and a substituted or non-substituted arylthio group; and $R^7$ represents a hydrogen atom or a substituent selected from the group consisting of an amino group, a substituted amino group, a hydroxy group, a substituted or non-substituted alkylthio group and a substituted or non-substituted arylthio group.

\* \* \* \* \*